United States Patent [19]

Allen

[11] Patent Number: 4,664,708

[45] Date of Patent: May 12, 1987

[54] WATERFAST INK JET COMPOSITIONS

[75] Inventor: David A. Allen, Webster, N.Y.

[73] Assignee: Xerox Corporation, Stamford, Conn.

[21] Appl. No.: 796,838

[22] Filed: Nov. 12, 1985

[51] Int. Cl.$^4$ .................. C09D 11/00; C09B 69/10
[52] U.S. Cl. .................................. 106/22; 106/23; 8/647
[58] Field of Search .................. 8/647; 106/20–24

[56] References Cited

U.S. PATENT DOCUMENTS

| | | | |
|---|---|---|---|
| 3,234,025 | 2/1966 | Van Hoof et al. | 96/95 |
| 4,197,135 | 4/1980 | Bailey et al. | 106/23 |
| 4,299,630 | 11/1981 | Huang | 106/22 |
| 4,375,357 | 3/1983 | Wingard, Jr. et al. | 8/647 |
| 4,381,185 | 4/1983 | Swanson et al. | 8/647 |
| 4,520,143 | 5/1985 | Jellinek | 523/410 |
| 4,605,442 | 8/1986 | Kawashita et al. | 106/22 |

Primary Examiner—Theodore Morris
Attorney, Agent, or Firm—E. O. Palazzo

[57] ABSTRACT

Disclosed is an ink composition comprised of a major amount of water, and a polymeric dye comprised of the reaction product of a water soluble polymer with a reactive dye.

21 Claims, No Drawings

WATERFAST INK JET COMPOSITIONS

BACKGROUND OF THE INVENTION

The present invention is generally directed to ink compositions, and more specifically the present invention is directed to ink jet compositions and to processes for the preparation thereof. Accordingly, in an embodiment of the present invention there is provided aqueous ink compositions comprised of polymeric dyes, especially those dyes containing water soluble polymers with highly stable chromophores covalently bonded thereto. The aforementioned ink compositions in addition to possessing improved waterfastness are of a desirable nonfishy odor; possess desirable viscosity values, acceptable surface tension characteristics, improved drying properties; and further, these inks are free of environmental hazards in that they, for example, evidence a negative Ames test and thus are nonmutagenic. Also, the ink compositions of the present invention can be altered by added spreading substances such as benzyl alcohol, thereby enabling increased spot sizes.

Compositions which are useful in ink jet printing systems are well known, and generally contain water soluble dyes. There is thus disclosed, for example, in U.S. Pat. No. 3,846,141 an ink composition useful in jet printing comprised of an aqueous solution of a water-soluble dye; and a humectant material formed of a mixture of a lower alkoxy triglycol; and at least one other compound selected from the group consisting of a polyethylene glycol, a lower alkyl ether of diethylene glycol, and glycerol. According to the disclosure of this patent, the printing inks have the desired viscosity for use in jet printing in that the viscosity of the composition is subjected to little variation with use as water is lost by evaporation during recirculation of the ink composition through the jet printer. Moreover, apparently the humectant system disclosed in this patent substantially prevents or minimizes tip drying of the printing ink in the orifice or nozzle during down time of the printer, such as when the printer is rendered inoperative. As further disclosed in this patent, the basic imaging technique in jet printing involves the use of one or more ink jet assemblies connected to a pressurized source of ink. Each individual ink jet includes a very small orifice usually of a diameter of 0.0024 inches, which is energized by magneto restrictive piezo-electric means for the purpose of emitting a continuous stream of uniform droplets of ink at a rate of 33 to 75 kilohertz. This stream of droplets is desirably directed onto the surface of a moving web of, for example, paper; and is controlled to form printed characters in response to video signals derived from an electronic character generator and in response to an electrostatic deflection system.

Also, there is disclosed in U.S. Pat. No. 4,279,653 ink jet compositions containing water-soluble wetting agents, a water-soluble dye and an oxygen absorber. Similarly, U.S. Pat. No. 4,196,007 describes an ink jet printing composition with an aqueous solution of a water-soluble dye and a humectant consisting of at least one water-soluble unsaturated compound. Further, there is disclosed in U.S. Pat. No. 4,267,088 coatings particularly useful as marking inks wherein there is selected an epichlorohydron—modified polyethylenamine and an ethylene oxide modified polyethylenamine in an aqueous solution. Other prior disclosing aqueous inks for ink jet printing include U.S. Pat. Nos. 4,101,329; 4,290,072; 4,383,859; 4,235,773; 4,279,814; 4,443,371; 4,286,989; 4,299,630; 4,167,393; 3,864,296; 4,238,234; 3,234,025; 4,520,143; 3,920,855; and 4,182,612.

Additionally, there is disclosed in U.S. Pat. No. 4,197,135 ink compositions with improved waterfastness comprised of at least one water soluble dye, and a polyamine with 7 or more nitrogen atoms per molecule. Specifically, there is illustrated in this patent an ink composition comprising an aqueous solution of at least one water-soluble dye, and about 0.5 percent to about 10 percent by weight concentration of a polyamine having 7 or more nitrogen atoms per molecule. In column 1, beginning at line 61, it is indicated that the preferred polyamines have the hydrogen of the primary amine group replaced with either a methyl or a hydroxy ethyl group. Examples of the fully substituted polyamines selected are outlined in column 2, beginning at line 40.

Furthermore, there is disclosed in copending application U.S. Ser. No. (not yet assigned) D/85099 entitled Waterfast Ink Jet Compositions and Process, the disclosure of which is totally incorporated herein by reference, ink compositions comprised of a major amount of water, a hydroxyethylated polyethylenimine polymer, and a dye component, wherein the polymer has incorporated therein from about 65 percent by weight to about about 80 percent by weight of hydroxyethyl groups. Also, copending application U.S. Ser. No. 723,376, the disclosure of which is totally incorporated herein by reference, illustrates an ink jet composition with certain sulfonated trisazo dyes.

Ink compositions for jet printing can be prepared by a number of known methods. Generally, these methods involve dissolving the various dyes, humectants, viscosity control agents, paper fixing additives, surface tension control additives, biocides and anti-oxidants in a known volume of water; followed by adjusting the pH (and concentration) of the solution to a desirable level. In those situations where the pigments selected are not water-soluble, the inks are prepared by standard known milling processes. However, such pigment dispersions are generally not sufficiently stable, accordingly, when incorporated into a printing machine the ink particles tend to agglomerate resulting in the clogging of the small nozzles contained in the ink jet devices.

Although the above compositions may be suitable for their intended purposes, there continues to be a need for improved ink jet compositions and processes thereof. Additionally, there continues to be a need for ink jet compositions which when in use result in excellent optical print densities, and possess very acceptable waterfastness characteristics. Moreover, there continues to be a need for inks that possess nonmutagenic characteristics enabling them to be safely used in ink jet printing processes. Also, there is a need for ink compositions that permit an increase in the spot size of the ink. Furthermore, there is a specific need for nonmutagenic ink compositions with waterfastness of greater than about 80 percent. There also is a need for polymeric dyes for ink jet compositions formulated from the reaction of a sulfonated water soluble dye with a polyethylenimine. Inks with these dyes incorporated therein have, in many instances, improved physical properties of viscosity, surface tension, and pH; and further, the ink rapidly penetrates into paper substrates. Additionally, the aforementioned inks possess exceptional waterfastness as illustrated hereinafter.

SUMMARY OF THE INVENTION

It is an object of the present invention to provide ink compositions, and processes thereof which overcome some of the above-noted disadvantages.

In another object of the present invention there are provided ink compositions with improved waterfastness.

Also, in a further object of the present invention there are provided ink compositions with water soluble polymers having highly sensitive chromophores or dyes bonded thereto.

Further, an additional object of the present invention resides in ink compositions with improved waterfastness containing therein the reaction product of sulfonated water soluble dyes and polyethylenimines.

An additional object of the present invention resides in the provision of aqueous ink compositions containing in addition to polymeric dyes, surfactants, humectants, biocides, chelating agents, and buffer solutions.

Additionally, in another object of the present invention there are provided aqueous ink jet compositions comprised of various colored dyes with dye chromophores of high light sensitivity covalently bonded to water soluble polymers.

In yet still another object of the present invention there are provided aqueous ink jet compositions comprised of various polymeric dyes generated by the reaction of sulfonated water soluble dyes containing a reactive triazinyl group and polyethylenimine.

These and other objects of the present invention are accomplished by the provision of ink compositions, particularly useful in jet printing processes, and comprised of polymeric dyes and water. There is thus provided in one embodiment of the present invention an ink jet composition with improved waterfastness comprised of a major amount of water; and a polymeric dye comprised of water soluble polymers, preferably polyethylenimines, with highly light stable chromophores covalently bonded thereto. The aforementioned ink compositions have superior waterfastness characteristics, in comparison to many of the prior art inks; and the other desirable properties illustrated herein.

Specifically, in one preferred embodiment of the present invention there are provided ink jet compositions comprised of from about 80 percent by weight to about 95 percent by weight of water, including dionized or distilled water; and from about 5 percent by weight to about 20 percent by weight of a polymeric dye generated by the reaction of a sulfonated water soluble dye containing preferably, for example, reactive monochlorotriazinyl groups thereon, and polyethylenimines.

The aforementioned ink compositions of the present invention can be prepared by admixing the polymeric dye with water. Specifically, the ink jet compositions of the present invention are prepared by (1) providing an aqueous water soluble polymer such as polyethylenimine; and (2) affecting reaction thereof with a reactive dye, resulting in the dye being covalently bonded thereto. In one preferred embodiment of the present invention, the polymeric dye is obtained by the reaction of a sulfonated water soluble dye possessing reactive monochlorotriazinyl groups; and polyethylenimines of the formula $(-CH_2CH_2NH-)_x$ wherein x is a number of from about 1,000 to about 1,500.

One specific method for obtaining the ink compositions illustrated herein entails the admixing of the polymeric dye and water, followed by filtration to permit removal of any contamination. Filtration can be affected with a filter that will allow the retention of particles of a certain diameter size, for example, of from about 0.2 microns. Also, the polymeric dyes selected can be prepared, for example, by the formulation of a solution of a reactive dye and a polyethylenimine followed by heating, up to 100° C., and thereafter filtering the resulting solution through a membrane with pores of the size of about 1 to 2 microns, and thereafter through a membrane with 0.2 micron pores.

Specific examples of commercially available dyes selected for the present invention include sulfonated water soluble dyes preferably possessing a reactive monochlorotriazinyl groups such as CI Reactive Red 4, Color Index 18105; C.I. Reactive Black 1, Color Index 17916; C.I. Reactive Blue 7, Color Index 74460; Cibacron Brilliant Yellow 3G-P, Color Index Reactive Yellow Z; and the like. Other dyes not specifically detailed herein, particularly those commerically available can be selected for the ink compositions of the present invention providing the objectives thereto are achievable. With further regard to the reactive dyes selected for the inks of the present invention, they were primarily obtained from Pylam Products Company, Inc. Garden City, N.J.

With further reference to specific ink compositions of the present invention, they have incorporated therein from about 4 to about 15 percent, and preferably from about 6 to about 10 percent by weight of polymeric dye; and from about 85 percent to about 96 percent, and preferably from about 90 percent to about 94 percent by weight of water, especially distilled or dionized water.

A further important embodiment of the present invention comprises adding to the ink compositions illustrated spreading substances, primarily for reducing spot size, in an amount of from about 1 percent by weight to about 10 percent by weight, and preferably in an amount of from about 1 percent by weight to about 5 percent by weight. Examples of the aforementioned substances are benzyl alcohol, N-n-butyldiethanolamine, 2-(2-butoxyethoxy)-ethanol, and 1-methyl-2-pyrrolidinone.

Other known additives may be incorporated into the ink compositions of the present invention inclusive of biocides in an amount of 0.1 to 0.5 percent, and preferably in an amount of 0.1 percent by weight, such as Dowcil-75; chelating agents in an amount of from about 0.1 percent to about 0.5 percent by weight, and preferably in an amount of from about 0.2 percent by weight to about 0.4 percent by weight, such as EDTANa 4, commercially available; a buffer solution present in an amount of from about 5 percent to about 20 percent, and preferably in an amount of 5 to 10 weight percent, inclusive of a mixture of a sodium hydroxide solution and a sodium bicarbonate solution; and a humectant in an amount of from about 1 percent to about 15 weight percent, and preferably in an amount of from about 5 percent to about 10 weight percent, such as glycerol. The aforementioned ink compositions can be prepared by combining the reactive dye, the polyethylenimine, and water; and subsequently adding thereto the additives indicated inclusive of humectants and biocides.

Ink compositions comprised of the components illustrated herein are of improved waterfastness as compared to many prior art ink compositions, particularly those wherein the dye selected is a reactive dye rather than a polymeric dye. Specifically, exceptional waterfastness of from about 80 to about 100 percent is achievable with the ink compositions of the present invention. Simultaneously, these inks have other desirable properties including a pH of from about 9 to about 12, and preferably from about 9 to about 10, a surface tension of from about 45 dynes/cm, to about 65 dynes/cm; and a viscosity of from about 1.8 to about 3 centipoises.

The following examples are being supplied to further define various species of the present invention, it being noted that these examples are intended to be illustrative only and are not intended to limit the scope of the present invention; parts and percentages are by weight unless otherwise indicated.

EXAMPLE I

There was prepared an ink jet composition by formulating a water soluble polymer with a reactive dye attached thereto by mixing 24.90 grams of Reactive Red 24 with 200 milliliters of deionized water in a beaker. The pH of the resulting mixture was 6.8. Thereafter there was added to the beaker 5.10 grams of polyethylenimine of a molecular weight of about 55,000 as a 10 percent aqueous solution. The pH of the resulting mixture was now 10.7, and further all the reactants added were dissolved. The beaker was then covered and stirring was continued while heating the mixture contained therein at from about 95° to 100° C. This temperature was maintained for 1 hour, and thereafter the reaction mixture was cooled to room temperature followed by filtering the solution through a 1.2 micron nominal cellulose membrane medium. Subsequently, the mixture was refiltered through a 0.2 micron cellulose membrane. Thereafter, the weight of the solution was adjusted to 300 grams by adding deionized water. The measured pH of the resulting mixture was 9.9, and the solids content was 10 percent.

EXAMPLE II

There was prepared a red ink composition by admixing 10 percent by weight of a polymeric dye obtained by the reaction of 24.90 grams of a Reactive Red 4 dye (I); and 5.10 grams of a polyethylenimine of a molecular weight of 55,000, wherein the weight ratio of the reactive dye to the polyethylenimine was 6; and 90 percent by weight of distilled water. The resulting ink jet solution was then passed through a filter with a pore size of 0.2 microns.

A black ink composition was then prepared by repeating the aforementioned method with the exception that there was selected a polymeric dye comprised of the reaction product of a Reactive Black dye 31 (II), and polyethylenimine in a weight ratio of 9.

Substantially similar ink compositions were prepared by repeating the above procedure with the exception that there was selected in place of the polymeric dyes a Reactive Red dye 4 (III); and a Reactive Black dye 31 (IV). The above prepared four ink compositions had the following measured properties:

TABLE 1

|  | I* | II | III | IV |
|---|---|---|---|---|
| pH | 10.9 | 9.5 | 9.0 | 6.4 |
| Surface Tension (dynes/cm) | 44 | 42 | 40 | 48 |
| Viscosity (centipoises) | 1.7 | 2.0 | 1.5 | 1.8 |
| Optical Density | 0.70 | 0.56 | 0.78 | 0.59 |
| Waterfastness (percent) | 87 | 100 | 23 | 36 |

*Indicates polymeric dye or dye selected.

The pH values reported were obtained with an Orion Research pH meter, Model 701A; while the surface tension values were determined by the use of a Fisher Surface Tensionmat, Model 21. Further, the viscosity values were generated with a Brookfield Viscometer, Model EX-200; the optical density values were obtained with a MacBeth Densitometer, Model RD514; and the waterfastness values were determined by immersing papers (4024), which have been coated individually at the same weight per unit area with the above prepared ink compositions into water under specific conditions of time, about 2 minutes, and agitation; and thereafter determining the ratio of the optical density of each coating divided by the optical density of an identical coating which was not immersed in water.

EXAMPLE III

There was prepared four additional ink compositions, identified as Compositions V, VI, VII and VIII by repeating the procedure of Example I with the exception that for Composition V there was selected the polymer dye obtained by the reaction of Reactive Blue 7, with polyethylenimine, molecular weight of 55,000, the weight ratio of dye to polyethylenimine being 5.6; for Composition VI a polymeric dye generated by the reaction of Reactive Red 24, with polyethylenimine, molecular weight of 55,000 and a weight ratio of reactive dye to polyethylenimine of 4; for Composition VII a Reactive Blue 7 dye; and for Composition VIII a Reactive Red 24 dye instead of, in each instance with respect to VII and VIII, the reaction product of Reactive Red 4 dye, and polyethylenimine. These inks had the following properties:

TABLE 2

|  | V | VI | VII | VIII |
|---|---|---|---|---|
| pH | 10.8 | 10.5 | 7.1 | 8.4 |
| Surface Tension (dynes/cm) | 50 | 57 | 33 | 27 |
| Viscosity (centipoises) | 1.7 | 1.8 | 1.4 | 1.4 |
| Optical Density | 0.71 | 0.72 | 0.70 | 1.03 |
| Waterfastness (percent) | 100 | 99 | 24 | 16 |

EXAMPLE IV

A cyan ink composition was prepared by repeating the procedure of Example I with the exception that there was selected the polymeric dye formulated by the reaction of a purified Reactive Blue 7, and the polyethylenimine of a molecular weight of 55,000, which dye contains 88 percent by weight of the Blue 7, and 12 percent by weight of the polyethylenimine. This ink composition exhibited the following properties:

TABLE 3

|  | Composition |
|---|---|
| pH | 9.8 |
| Surface Tension (dynes/cm) | 55 |
| Viscosity (centipoises) | 1.7 |
| Optical Density | 0.81 |
| Waterfastness (percent) | 84 |
| Lightfastness | 98 |

The lightfastness values were determined by exposing a paper (4024 paper throughout) containing a coating of the above prepared ink composition to a xenon arc lamp for a period of 24 hours in an Atlas 25 FR Fadeometer. The ratio of the final optical density to the initial optical density results in the lightfastness number.

EXAMPLE V

A magenta ink composition was prepared by repeating the procedure of Example I with the exception that there was selected as the polymeric dye the reaction product of Reactive Red 4 purified dye; and polyethylenimine, with a molecular weight of 55,000, the polymeric dye containing 83 percent by weight of the Red 4, and 17 percent by weight of the polyethylenimine. This ink composition exhibited the following properties:

TABLE 4

|  | Composition |
| --- | --- |
| pH | 10.2 |
| Surface Tension (dynes/cm) | 47 |
| Viscosity (centipoises) | 2.0 |
| Optical Density | 1.08 |
| Waterfastness (percent) | 81 |
| Lightfastness | 82 |

EXAMPLE VI

A black ink composition was prepared by repeating the procedure of Example I with the exception that there was selected as the polymeric dye the product obtained by the reaction of 29.7 percent Reactive Blue 7, 37.5 percent of Reactive Yellow 2; and 16.7 percent Reactive Red 24, with a polyethylenimine of a molecular weight of 55,000, the resulting dye containing 29.2 percent of the Blue 7; 37.5 percent of the Yellow 2; 16.7 percent of the Red 24; and 16.7 percent of the polyethylenimine. This black ink composition exhibited the following properties:

TABLE 5

|  | Composition |
| --- | --- |
| pH | 10.4 |
| Surface Tension (dynes/cm) | 46 |
| Viscosity (centipoises) | 3.0 |
| Optical Density | 0.99 |
| Waterfastness (percent) | 90 |
| Lightfastness | 87 |

EXAMPLE VII

A black ink composition was prepared by repeating the procedure of Example I with the exception that there was selected as the polymeric dye the product obtained by the reaction of 83.3 percent of purified Reactive Black 13, and the polyethylenimine of a molecular weight of 55,000, the product being comprised of 83.3 percent by weight of the Black 13, and 16.7 percent by weight of the polyethylenimine. This ink composition exhibited the following properties:

TABLE 6

|  | Composition |
| --- | --- |
| pH | 0.4 |
| Surface Tension (dynes/cm) | 71 |
| Viscosity (centipoises) | 2.2 |
| Optical Density | 0.87 |
| Waterfastness (percent) | 89 |
| Lightfastness | 100 |

EXAMPLE VIII

A black ink composition was prepared by repeating the procedure of Example I with the exception that there was selected as the polymeric dye the reaction product of purified Reactive Black 23, 83.3 percent by weight, and 16.7 percent by weight of the polyethylenimine with a molecular weight of 55,000. This ink composition exhibited the following properties:

TABLE 7

|  | Composition |
| --- | --- |
| pH | 10.6 |
| Surface Tension (dynes/cm) | 67 |
| Viscosity (centipoises) | 1.8 |
| Optical Density | 0.85 |
| Waterfastness (percent) | 88 |
| Lightfastness | 98 |

EXAMPLE IX

A black ink composition was prepared by repeating the procedure of Example I with the exception that there was selected as the polymeric dye the reaction product of purified Reactive Black 34, 83.3 percent by weight, and 16.7 percent by weight of polyethylenimine of a molecular weight of 55,000. This ink composition exhibited the following properties:

TABLE 8

|  | Composition |
| --- | --- |
| pH | 9.4 |
| Surface Tension (dynes/cm) | 53 |
| Viscosity (centipoises) | 1.8 |
| Optical Density | 0.87 |
| Waterfastness (percent) | 79 |
| Lightfastness | 84 |

Ink compositions can also be prepared by repeating the procedure of Example I with the exception there is added thereto, as a humectant, Carbowax 200 in an amount of 7.5 percent by weight; the chelating agent EDTA $(Na)_4$ in an amount of 0.2 percent by weight; the biocide Dowicil-75 in an amount of 0.1 percent by weight; and as a buffer 5 percent by weight of a solution of 1,000 milliliters, 0.05 molar, sodium bicarbonate; and 276 milliliters, 0.10 molar, of sodium hydroxide.

Images with superior resolution and no background deposits, and with excellent solids are obtained when the ink compositions prepared in accordance with the inks of the present invention, reference Examples I to VIII, are incorporated into a laboratory ink jet deflection drop fixture.

Also, with computer controlled hardware, small droplets of the ink composition prepared substantially in accordance with Example I were sprayed onto a paper surface to form an image. There was further added to the above ink N-methylpyrrolidone resulting in 10 percent by weight of this component; benzyl alcohol resulting in 3 percent by weight of this component being present in the final ink; and distilled water in an amount permitting 80 percent by weight of this component to be present in the final ink composition. Images with a waterfastness of 90 percent; an optical density of 0.87; and an acceptable magenta color were generated in an ink jet deflection drop test fixture.

Other modifications of the present invention may occur to those skilled in the art based upon a reading of the present disclosure, and these modifications are intended to be included with in the scope of the present invention.

What is claimed is:

1. An ink composition comprised of a major amount of water and a polymeric dye comprised of a polyethylenimine and covalently bonded thereto a sulfonated water soluble dye containing monohalotriazinyl groups.

2. An ink composition comprised of a major amount of water and a polymeric dye comprised of a polyethylenimine of the formula ($-CH_2CH_2NH-$)$_x$ wherein x is a number of from about 1,000 to about 1,500 having covalently bonded thereto a sulfonated water soluble dye containing monohalotriazinyl groups.

3. An ink composition in accordance with claim 1 wherein the polyethylenimine is of the formula ($-CH_2CH_2NH-$)$_x$ wherein x is a number of from about 1,000 to about 1,500.

4. A composition in accordance with claim 1 wherein the polymeric dye results from the reaction of a sulfonated water soluble dye containing monohalotriazinyl groups, and a polyethylenimine of the formula ($-CH_2CH_2NH-$)$_x$ wherein x is a number of from about 1,000 to about 1,500.

5. A composition in accordance with claim 1 wherein the polyethylenimine is of a molecular weight of from 10,000 to about 70,000.

6. A composition in accordance with claim 1 wherein the polyethylenimine is of a molecular weight of from about 50,000 to about 70,000.

7. A composition in accordance with claim 1 wherein the sulfonated dye is Reactive Red 4.

8. A composition in accordance with claim 1 wherein the sulfonated dye is Reactive Black 31.

9. A composition in accordance with claim 1 wherein the sulfonated dye is Reactive Blue 7.

10. A composition in accordance with claim 1 wherein the sulfonated dye is Reactive Red 24.

11. A composition in accordance with claim 1 wherein a black polymeric dye is generated by the reaction of Reactive Blue 7, Reactive Yellow 2, and Reactive Red 24 with the polyethylenimine.

12. A composition in accordance with claim 1 wherein the Reactive Blue 7 is present in an amount of about 29 percent by weight, the Reactive Yellow 2 is present in an amount of about 38 percent by weight, the Reactive Red 24 is present in an amount of about 17 percent by weight; and the polyethylenimine is present in an amount of about 17 percent by weight.

13. A composition in accordance with claim 1 wherein the resulting ink possesses a waterfastness of from about 85 percent to about 100 percent.

14. A composition in accordance with claim 1 wherein the pH of the ink is from about 9 to about 10.

15. A composition in accordance with claim 1 wherein the polymeric dye is present in an amount of from about 4 percent by weight to about 15 percent by weight.

16. A composition in accordance with claim 1 wherein distilled water is selected.

17. A composition in accordance with claim 1 wherein the water is present in an amount of from about 80 percent to about 95 percent by weight.

18. A composition in accordance with claim 1 further including therein a compound selected from the group consisting of benzyl alcohol, N-n-butyldiethanolamine, 2-(2-butoxyethoxy)-ethanol, and 1-methyl-2-pyrrolidinone.

19. A composition in accordance with claim 18 wherein the compounds selected are present in an amount of from about 3 percent to about 13 weight percent.

20. A composition in accordance with claim 2 wherein the soluble dye is selected from the group consisting of Reactive Red 24, Reactive Red 4, Reactive Blue 7, and mixtures thereof.

21. An ink composition comprised of about 80 percent to about 95 percent by weight of a red ink composition, and from about 4 percent by weight to about 15 percent by weight of a polymeric dye comprised of a sulfonated water soluble dye containing monohalotriazinyl groups covalently attached to a polyethylenimine, and wherein the water soluble dye is selected from the group consisting of Reactive Red 24, Reactive Red 4, Reactive Blue 7, and mixtures thereof.

* * * * *